Jan. 28, 1969  E. P. AGHNIDES  3,424,387
WATER AERATORS
Original Filed June 27, 1962
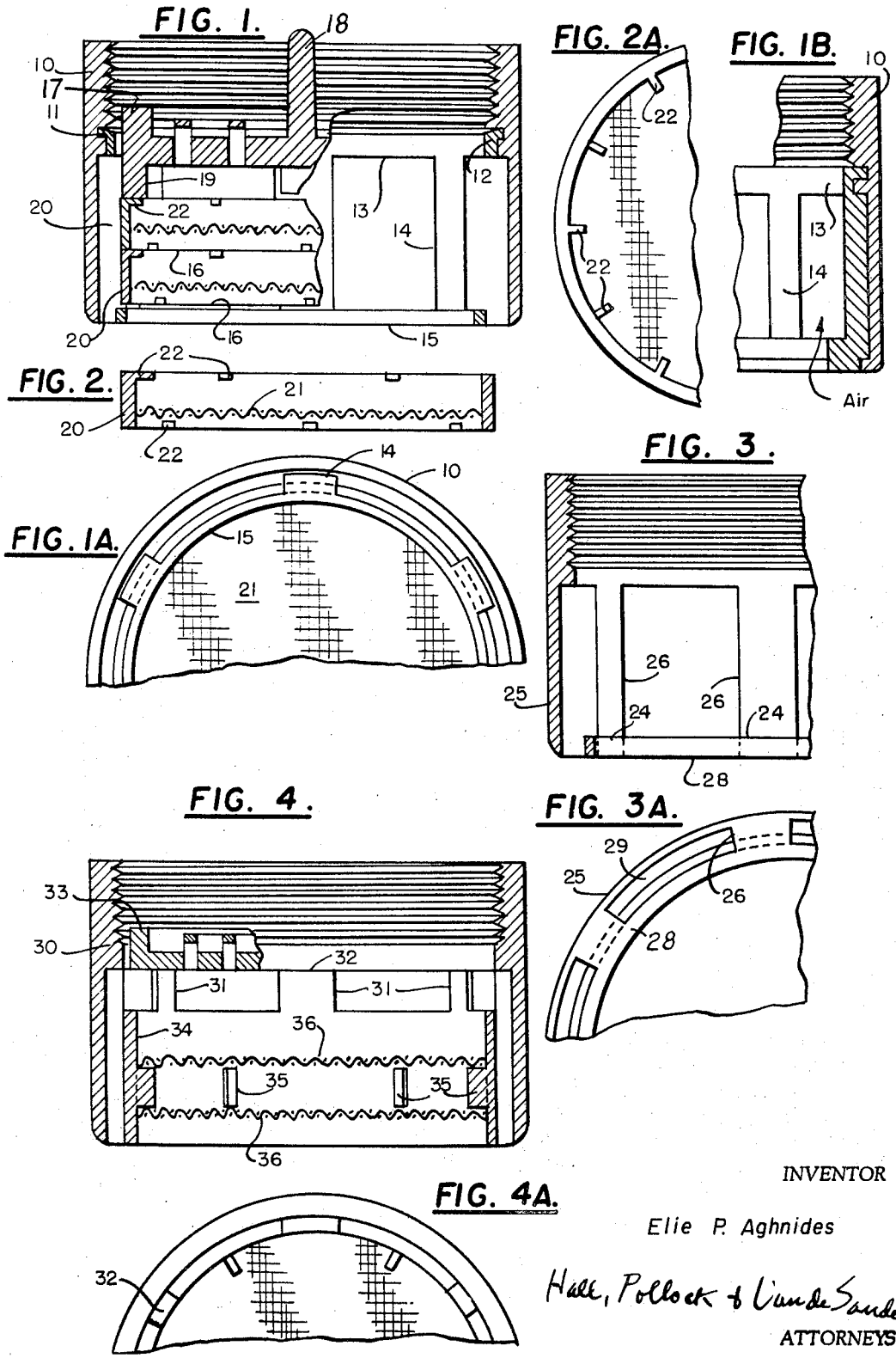
INVENTOR
Elie P. Aghnides
Hall, Pollock & Vande Sande
ATTORNEYS United States Patent Office 3,424,387
Patented Jan. 28, 1969

3,424,387
WATER AERATORS
Elie P. Aghnides, 795 5th Ave., New York, N.Y. 10021
Original application June 27, 1962, Ser. No. 205,712, now Patent No. 3,211,383, dated Oct. 12, 1965. Divided and this application Oct. 5, 1965, Ser. No. 493,201
U.S. Cl. 239—428.5                          4 Claims
Int. Cl. F16k 45/04; B05b 1/02

ABSTRACT OF THE DISCLOSURE

The disclosure relates to water aerators which are adapted to be secured to the outlet end of a water faucet and to provide a highly aerated stream of water containing numerous air bubbles which are intimately admixed with the water stream. The aerator is provided with a plurality of longitudinal ribs in the interior of the casing, and these ribs support an annular member which extends to the downstream end of the aerator and supports one or more mixing screens. The casing and the ribs define an air inlet passageway from the discharge end of the aerator, through the spaces between the ribs, to a mixing space between the aforementioned mixing screens and an upstream jet-forming means.

---

This application is a division of my U.S. patent application Ser. No. 205,712, filed June 27, 1962, and now U.S. Patent No. 3,211,383 issued Oct. 12, 1965.

This invention relates to improvements in water aerators of the type that are connected to the discharge end of a water faucet in order to cause a bubbly, air-laden stream of water to issue therefrom. More particularly, the present invention is concerned with improvements in aerators which are formed wholly or partially from plastic materials.

Water aerators of the type here in involved are well-known in the art. In my basic U.S. Patent No. 2,210,846, entitled "Fluid Mixing Device," issued Aug. 6, 1940, the general principles of the aforesaid aerator are disclosed, air being shown as entering through the side-wall of the device. In subsequent of my pending applications and issued patents, I have shown fluid mixing devices wherein the air may enter the bottom of the device rather than through the side wall. In still other patent applications, such as my application S.N. 163,972 which is a continuation-in-part of my prior copending application S.N. 847,-823, I have shown aerators which are constructed of a relatively soft plastic material, the advantages of this material being that there is less tendency for clogging deposits to form thereon, the aerator is more inexpensively manufactured, and it is more readily possible to provide a leakproof construction without the use of washers and the like.

In general the water aerators which I have disclosed in my various applications and patents comprise an upstream perforate diaphragm which produces a plurality of high-velocity streamlets. These streamlets impinge upon downstream mixing screens. Air is introduced into the aerator into the region upstream of the screens but downstream of the perforate diaphragm. This air mixes finely with the water and becomes intimately interspersed with the streamlets as they pass through the mixing screens so that a coherent jet of whitish, air-laden and bubbly water issues therefrom. One objective in the design of such water aerators is to maximize the amount of air which can be admitted into the mixing region since, the more air that is admitted, the more the stream tends to have the desired characteristics. Also, it is highly desired that the aerator be so constructed internally as to minimize the opportunity for dirt particles and calcium deposits to form since these not only are unsanitary but tend to impede the flow of water through the aerator.

Described briefly, the present invention comprises in one embodiment thereof a water aerator having a plastic insert which supports both the perforate diaphragm and the mixing screens. This plastic insert is so constructed as to provide a considerable increase in the amount of air which is admitted into the region above the mixing screens over known prior constructions. The plastic insert firmly holds the mixing screens in place but does not seriously restrict the flow of air upwardly into the area above the mixing screen nor does it seriously impede the flow of air-laden water from the discharge end of the aerator. In another embodiment of this invention I have illustrated an aerator having essentially the same characteristics as that just described, but accomplishing this with a one-piece construction for the casing, and which is formed entirely of plastic rather than just comprising a plastic insert in a metal container. In still another embodiment, I have disclosed a one-piece plastic aerator body having a novel screen-spacing means and, in connection with this embodiment, I have disclosed an improved method for fastening the mixing screens in place within the aerator body.

It is, accordingly, an object of this invention to provide an improved water aerator comprising a metallic outer shell with a plastic internal insert for supporting the perforate diaphragm and the mixing screens.

It is another object of this invention to provide an all-plastic water aerator body construction which provides a large air inlet area and also a large discharge area.

It is another object of this invention to provide a molded, all-pastic aerator body having a novel means for supporting the mixing screens and also for supporting the perforate diaphragm.

It is a further object of this invention to provide a screen assembly for a water aerator or the like employing a novel construction for maximizing the effective screen area.

In the description of the invention that follows, reference will be made to the accompanying drawings in which:

FIGURES 1 and 1A are cross-sectional side views and bottom views respectively of one embodiment of the water aerator of my invention:

FIGURE 1A is a cross-sectional side view illustrating a modification of the embodiment of my invention shown in FIGURES 1 and 1A;

FIGURES 2 and 2A are cross-sectional side views and bottom views of a typical mixing screen as shown in the embodiment of FIGURE 1;

FIGURES 3 and 3A are cross-sectional side views and bottom views respectively of a one-piece molded plastic aerator casing; and FIGURES 4 and 4A are cross-sectional side views and bottom views respectively of a still different embodiment of the present invention.

Referring first to FIGURES 1 and 1A, the main aerator body casing 10 is shown as having annular internal threads at its upper inner surface for engagement with corresponding threads on the outer surface of the discharge end of a faucet (not shown). Of course, external threads (not shown) may be provided for an aerator intended for use with an internally threaded faucet. This main body portion 10 may be formed of metal such as brass. The upper portion of casing 10 is preferably formed with somewhat thicker side-walls so that the cutting of the threads therein will not unduly weaken the casing; the side-walls downstream of the threaded portion are made as thin as possible, consistent with the strength desired, to maximize the cross-sectional area and thereby provide maximum space for the discharge of water and the inlet of air.

At substantially that portion of the inner axial length of the aerator where the change in wall thickness occurs, there is provided an inner annular groove 11 which receives a protruding rim 12 integral with the plastic insert 13. This insert 13 is formed of a suitably soft plastic material which is at least partially deformable to thereby permit its being forced into place within the confines of the inner side wall of main body portion 10 with the rim 12 being snapped into place in the annular groove 11.

The plastic insert 13 comprises a plurality of depending rib members 14 which support an integral bottom annular member 15 which acts as a ledge to support the mixing screen assemblies 16 and also the perforate diaphragm 17. The depending ribs 14 are relatively narrow so that altogether they take up only a relatively small part of the circumference, wherefor quite large air passageways are formed between successive of these ribs 14 so that an ample quantity of air may be admitted into these plurality of passageways and carried upwardly into the region above the uppermost of the mixing screen assembly 16 and below the perforate diaphragm 17.

Diaphragm 17 is generally of the type disclosed in my Patent No. 2,998,933, issued Sept. 5, 1961. This diaphragm may be molded in one piece of plastic and is so constructed as to provide a relatively large number of tortuous paths, whereby a plurality of high-velocity streamlets are formed, each of which impinges on the upper surface of the uppermost mixing screen. The upwardly protruding member 18 which is integral with the diaphragm 17 provides a convenient means for lifting the diaphragm member out of the insert 13.

In assembling the various parts of the aerator of FIGURES 1 and 1A, the two mixing screen assemblies 16 are first inserted through the inlet end of the aerator. The first of these has its lower edge resting upon the ledge formed by the upper surface of the depending annular member 15. The second screen assembly then rests upon the lower one, and diaphragm 17 is placed with its depending annular rim 19 being supported by the plurality of inwardly extending protrusions 22 which are integral with the frame 20 of screen assembly 16.

The modified aerator shown in FIGURE 1B is generally similar to that of FIGURES 1 and 1A, but differs in that the inside bottom edge of casing 10 is bent slightly inward to form a ledge which provides further support for the plastic insert 13.

A typical one of the screen assemblies 16 is shown in FIGURES 2 and 2A. The outer annular frame member 20, which is preferably formed of plastic, encloses a fine mesh screen 21 which, in effect, floats in position and is normally held in the bottommost position by reason of the force of the discharging aerated stream. About the periphery of the annular side wall are a number of inwardly extending protrusions 22 which hold the screen 21 in place. These may be merely tabs which are integrally formed with the annular frame 20 and then bent inwardly. The several tabs together have a total circumferential length about the periphery of member 20 which is only a relatively small part of the total circumference of member 20 so that restriction of the effective screen area is minimized. The axial length of member 20 is, of course, selected in accordance with the desired screen spacing when the several frames are placed, one on top of the other, as in FIGURE 1.

The embodiment of FIGURES 1 and 1A is particularly suited where it is desired that the outer portion of the aerator be formed of metal. However, aerators which are formed entirely of plastic are now increasingly preferred principally because of the lower cost of their manufacture. Such an aerator is shown in FIGURES 3 and 3A which comprises substantially all of the desirable characteristics of the aerator of FIGURES 1 and 1A already described but is entirely of metal or plastic rather than being partly of metal, and may have member 28 cut off between the ribs 26.

In FIGURES 3 and 3A, the part which corresponds generally to the plastic insert 13 of FIGURE 1 and which comprises the depending ribs 26 and ledges 24 and annular member 28 is integral with the main aerator casing 25. The upper portion of the main aerator casing is again internally threaded but it will be understood that here, as in FIGURE 1, external threads (not shown) rather than internal threads may be provided. The depending ribs 26 which form the air inlet passageways therebetween, may be integral with the inner side wall of the casing 25 as is more clearly illustrated in FIGURE 3A. At their lower end, the ribs 26 support the annular member 28 whose upper surface forms a ledge upon which the lowermost of the mixing screen assemblies may rest. For clarity in illustration, neither the screen assemblies nor the diaphragm are shown; these may be similar to the corresponding parts shown in FIGURES 1 and 1A. As shown in FIGURE 3A, annular member 28 is separated by a gap from the inner side wall of the casing 25 so that quite large inlet air passageways are formed, a typical one being illustrated at 29.

FIGURES 4 and 4A illustrate a third embodiment of the invention comprising an all-plastic casing 30 (preferably formed of a thermoplastic material) which has inwardly extending rib members 31 each of which is integral with the inner side wall of member 30 and have flat upper surfaces so as to form a plurality of short ledges 32 upon which the diaphragm 33 rests. The members 31 support the inner annular wall 34 whose outer surface is suitably spaced from the inner surface of member 30 to thereby define a plurality of air inlet passageways whereby air admitted from the discharge end of the aerator may travel upwardly and be admitted into the region upstream of the uppermost of the mixing screens.

Spaced about the inner surface of the annular member 34 are a plurality of short, longitudinal ribs 35 which aid in positioning the mixing screens 36. The screens are press fitted into place and thereafter each aerator assembly is subjected to a dielectric heating process whereby the plastic material is slightly softened. As a result of this, the wires forming the peripheral edges of the screens 36 penetrate into the material so that, upon cooling and solidifying of the plastic, each screen is firmly embedded in the plastic.

Having described several improved embodiments of water aerators as specific embodiments of my invention, I wish it to be understood that my invention is not to be limited to the specific forms shown but is to be limited only in accordance with the scope of the appended claims.

I claim:

1. A water aerator comprising in combination, an external cylindrical casing member adapted for connection to the discharge end of a water faucet, a plurality of longitudinal ribs attached at least at their upper ends to the inner side wall of said casing, said ribs defining adjacent their upstream ends a planar surface, a jet-forming means having an outer annular wall supported by said planar surface, said ribs supporting at least one annular member whose outer wall is in spaced relation to the inner side wall of said casing, said annular member supporting at least one mixing screen downstream of said jet-forming means, said inner side wall of said casing member together with said annular member and also the apertures formed between successive of said ribs forming an inlet passage for air from the discharge end of the casing into a mixing space between said jet-forming means and the uppermost of said mixing screens, said mixing space being defined radially by the inner wall of said annular member.

2. The aerator of claim 1 in which said ribs extend substantially to the discharge end of said casing and said ribs and said annular member are integral.

3. The aerator of claim 2 in which said ribs and said casing member are integral.

4. The aerator of claim 1 in which a plurality of short longitudinal ribs are spaced about the inner surface of said annular member, said short ribs having their upper ends and their lower ends substantially coplanar to facilitate the positioning of first and second mixing screens thereagainst.

References Cited

UNITED STATES PATENTS 2,998,933  9/1961  Aghnides _____ 239—428.5

FOREIGN PATENTS 962,559  7/1964  Great Britain.

EVERETT W. KIRBY, *Primary Examiner.*

U.S. Cl. X.R.

239—590.3